United States Patent
Hogan et al.

(10) Patent No.: US 9,854,355 B2
(45) Date of Patent: *Dec. 26, 2017

(54) GROUNDING CIRCUIT FOR ALTERNATE AUDIO PLUG DESIGNS

(71) Applicant: Apple Inc., Cupertino, CA (US)

(72) Inventors: Roderick B. Hogan, San Francisco, CA (US); Joseph C. Curcio, San Jose, CA (US); David C. Breece, III, Sunnyvale, CA (US); Cara S. Yang, Sunnyvale, CA (US); Nathan Johanningsmeier, San Jose, CA (US); Kavitha Srinivasan, San Jose, CA (US)

(73) Assignee: APPLE INC., Cupertino, CA (US)

( * ) Notice: Subject to any disclaimer, the term of this patent is extended or adjusted under 35 U.S.C. 154(b) by 162 days.

This patent is subject to a terminal disclaimer.

(21) Appl. No.: 14/641,283

(22) Filed: Mar. 6, 2015

(65) Prior Publication Data
US 2015/0249876 A1   Sep. 3, 2015

Related U.S. Application Data

(63) Continuation-in-part of application No. 13/492,900, filed on Jun. 10, 2012, now Pat. No. 9,148,718.
(Continued)

(51) Int. Cl.
*H02B 1/00* (2006.01)
*H04R 3/00* (2006.01)
(Continued)

(52) U.S. Cl.
CPC ............... *H04R 3/00* (2013.01); *H02M 3/07* (2013.01); *H04R 1/1041* (2013.01); *H04R 2420/05* (2013.01)

(58) Field of Classification Search
CPC .. H03K 3/001; H03K 2017/6875; H04R 3/00; H04R 1/1041; H04R 2420/05; H02M 3/07
(Continued)

(56) References Cited

U.S. PATENT DOCUMENTS 7,705,659 B1   4/2010   Liu
8,526,636 B1 *  9/2013   Pai .......................... H03F 1/305
                                                  381/94.1

(Continued)

OTHER PUBLICATIONS

Non-Final Office Action dated Nov. 20, 2014 for U.S. Appl. No. 13/492,900, 10 pages.
(Continued)

*Primary Examiner* — Vivian Chin
*Assistant Examiner* — Ammar Hamid
(74) *Attorney, Agent, or Firm* — Kilpatrick Townsend & Stockton, LLP

(57) ABSTRACT

Circuits, methods, and apparatus for grounding contacts in an audio jack. One example may provide a driver, such as a charge pump, driving a first transistor or switch coupled between a first contact in an audio jack and ground, and a second transistor or switch coupled between a second contact in the audio jack and ground. The first transistor or switch and second transistor or switch may be p-channel transistors or n-channel transistors depletion or enhancement-mode transistors, floating-gate transistors, MEMs, relays, or other switching devices. The first and second transistors or switches may be on and conducting when power is removed from the driver.

22 Claims, 10 Drawing Sheets

Related U.S. Application Data

(60) Provisional application No. 62/006,252, filed on Jun. 1, 2014.

(51) Int. Cl.
*H02M 3/07* (2006.01)
*H04R 1/10* (2006.01)

(58) Field of Classification Search
USPC ....... 381/111, 122, 71.6, 74, 94.1–94.9, 309, 381/379, 95, 123; 327/379, 540, 541, 327/536; 439/668
See application file for complete search history.

(56) References Cited

U.S. PATENT DOCUMENTS

| | | | |
|---|---|---|---|
| 8,811,647 B2* | 8/2014 | Hansson | H04R 1/1033 381/379 |
| 2011/0268289 A1 | 11/2011 | Baranwal et al. | |
| 2012/0144072 A1 | 6/2012 | Hansson et al. | |
| 2013/0020882 A1* | 1/2013 | Prentice | H04R 29/004 307/116 |
| 2013/0142350 A1* | 6/2013 | Larsen | H04R 1/1041 381/74 |
| 2013/0329916 A1 | 12/2013 | Breece, III et al. | |
| 2014/0369520 A1* | 12/2014 | Elwart, II | H03F 1/305 381/94.5 |

OTHER PUBLICATIONS

Notice of Allowance dated May 26, 2015 for U.S. Appl. No. 13/492,900, 8 pages.

* cited by examiner

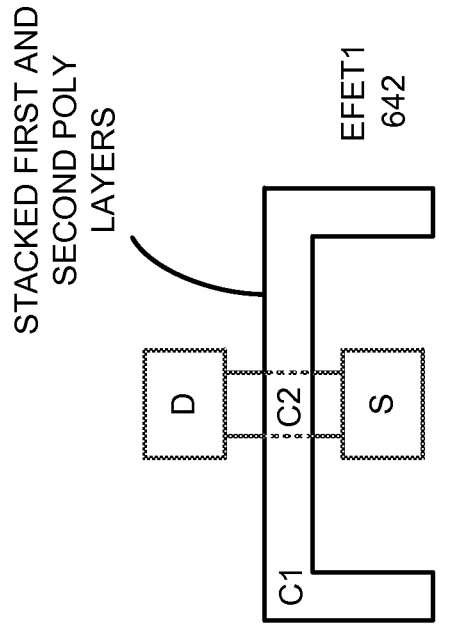
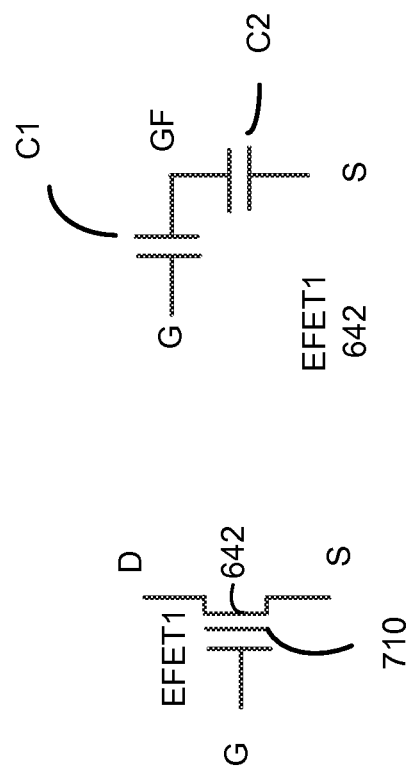
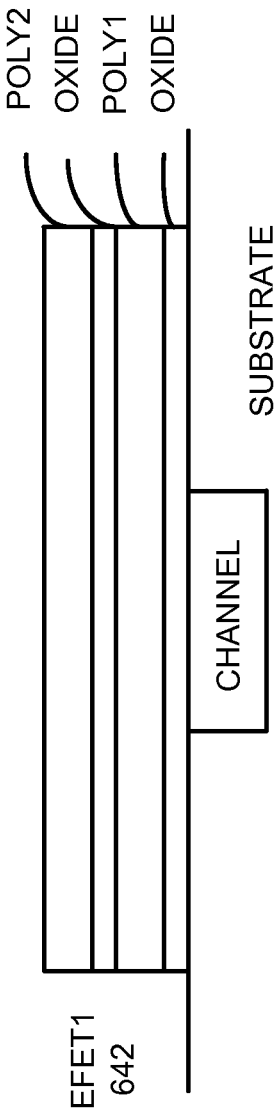
Figure 7C
Figure 7D
Figure 7B
Figure 7A

GROUNDING CIRCUIT FOR ALTERNATE AUDIO PLUG DESIGNS

CROSS-REFERENCES TO RELATED APPLICATIONS

This application is a continuation-in-part of U.S. patent application Ser. No. 13/492,900, filed Jun. 10, 2012, and claims the benefit of U.S. provisional patent application No. 62/006,252, filed Jun. 1, 2014, which are incorporated by reference.

BACKGROUND

Electronic devices, such as portable media players, storage devices, tablets, netbooks, laptops, desktops, all-in-one computers, cell, media, and smart phones, televisions and other display devices, navigation systems, and other devices have become ubiquitous in recent years. These devices often include an audio jack through which they receive and/or provide audio information. The audio jacks may include, or be connected to, electronic circuitry such as audio drivers for driving headphones or speakers, audio receivers for receiving audio signals from a microphone, and others. The audio jacks may be arranged to receive audio plugs that may be connected through audio cables to other electronic circuits such as home stereos, powered speakers, headphones or headsets, audio receivers, and other circuits.

These audio plugs may be electrical audio plugs. That is, they may include a number of ring-shaped contacts along their lengths. These contacts may connect to conductors in a cable attached to the audio plug. Contacts for three-pole audio plugs may include left audio, right audio, and ground. Contacts for four-pole audio plugs may include contacts for left audio, right audio, ground, and microphone.

These four-pole audio plug contacts may be configured in a conventional manner. That is, a tip of the audio plug may be a left audio channel contact, followed by a right audio channel, ground, and microphone contacts.

However, some four-pole audio plugs may be configured in an alternate manner. While the tip and following contacts remain a left audio channel contact and a right audio channel contact, the last two contacts are reversed relative to the conventional audio plug. Specifically, the next contact is a microphone contact, followed by ground.

This reversal, as well as the possibility of three or four-pole audio plugs, has necessitated the development of detection circuitry to be included with an audio jack to determine which type of audio plug is inserted. This detection circuit may drive a grounding circuit to ground the appropriate contact in the audio jack. Unfortunately, when power is removed, the grounding circuit may be powered down causing the appropriate contact in the audio jack to no longer be grounded. Under certain circumstances, this may lead to excessive ground noise in another electronic device connected to the audio jack through an audio cable.

Thus, what is needed are circuits, methods, and apparatus for grounding contacts in an audio jack that may avoid this ground noise.

SUMMARY

Accordingly, embodiments of the present invention may provide circuits, methods, and apparatus for grounding contacts in an audio jack. An illustrative embodiment of the present invention may provide a driver, such as a charge pump, driving a first switch coupled between a first contact in an audio jack and ground, and a second switch coupled between a second contact in the audio jack and ground. The first switch and second switch may be depletion-mode or enhancement-mode transistors, floating-gate transistors, p-channel or n-channel transistors, or they may be other types of devices such as micro-electro-mechanical switches, relays, or other types of switches.

The charge pump may be powered by an input supply voltage, for example, from an interface circuit. When the charge pump is powered up, it may provide a voltage to the gate of a first depletion mode transistor and the gate of a second depletion mode transistor. This voltage may turn off the first depletion mode transistor and the second depletion mode transistor. That is, it may place the first depletion mode transistor and the second depletion mode transistor in a high-impedance state. The voltage provided by the charge pump may be a positive voltage or a negative voltage, depending on whether the first depletion mode transistor and the second depletion mode transistor are p-channel transistors or n-channel transistors. The charge pump may be powered up when an electronic device housing the audio jack is powered up and audio circuitry associated with the audio jack is active. In other embodiments, the charge pump may be powered up at other times, such as whenever the electronic device is powered up.

When the electronic device is powered down, the input supply voltage may go to ground or a near ground potential. The output of the charge pump may decay to ground, thereby allowing the first depletion mode transistor and the second depletion mode transistor to turn on. That is, it may allow the first depletion mode transistor and the second depletion mode transistor to conduct. When the audio plug is a three-pole plug, this may ground the ground contact. When the audio plug is a four-pole plug, this may connect the two contacts that may be ground or microphone in the audio jack to ground. The charge pump may be powered down when the electronic device is powered off. In various embodiments of the present invention, the charge pump may be powered down at other times. For example, the charge pump may also be powered down when the electronic device is in a sleep state or at other times, such as when audio circuitry is inactive.

Another illustrative embodiment of the present invention may include circuitry to determine whether an audio plug inserted in an audio jack is a three-pole audio plug or a four-pole audio plug, and if it is a four-pole audio plug, whether it is of a conventional or alternate design. This embodiment may further provide control logic having an input for receiving this information. This information may be provided to the control logic using an I2C logic interface. The control logic may control a multiplexer to connect microphone circuitry to either a first contact or a second contact in the audio jack, where the first contact and the second contact are the two contacts that may be ground or microphone contacts. The control logic may further provide the input power supply to the charge pump that drives the first depletion mode transistor and the second depletion mode transistor.

In a specific embodiment of the present invention, the control logic may also control enhancement mode transistors coupled between the first contact in the audio jack and ground, and the second contact in the audio jack and ground, where the first contact and the second contact are the two contacts that may be ground or microphone contacts. Specifically, in the power-on mode when the first depletion mode transistor and the second depletion mode transistor are off, if the audio plug is a three-pole plug, the control logic may turn on both the enhancement mode transistors, thereby grounding the ground contact. In other embodiments of the present invention, one of the enhancement mode transistors may be turned on, again grounding the ground contact. In the power-on mode where the audio plug is a four-pole plug, the control logic may turn on either a first enhancement-mode transistor or a second enhancement-mode transistor to short either the first contact in the audio jack or the second contact in the audio jack to ground, as appropriate given whether the audio plug inserted in the audio jack is of a conventional or alternative design.

In some embodiments of the present invention, the depletion mode transistor that is in parallel with an on or active enhancement mode transistor may also be turned on to reduce ground impedance. In these situations, the presence of a conducting depletion mode transistor may provide a variation in ground impedance that may create noise. Accordingly, in other embodiments of the present invention, the depletion mode transistor may be kept off.

In these various embodiments, the depletion mode transistors may be turned on before the enhancement mode transistor is turned off. Similarly, the enhancement mode transistor may be turned on before the depletion mode transistor is turned off. This make-before-break arrangement may ensure that a path to ground is always present for the appropriate audio jack contact.

Another illustrative embodiment of the present invention may provide an integrated circuit including a charge pump having an output coupled to a gate of a first depletion mode transistor and a gate of a second depletion mode transistor. A first source/drain region of the first depletion mode transistor and the second depletion mode transistor may be coupled to pins of the integrated circuit. A second source/drain region of the first depletion mode transistor and the second depletion mode transistor may be coupled to a ground pin. The charge pump may receive an input power supply on a power pin. The charge pump may receive an input power supply level select input on another pin. Another pin of the integrated circuit may be provided for a capacitor to suppress noise on the voltage provided by the charge pump to the gates of the first depletion mode transistor and the second depletion mode transistor.

In other embodiments of the present invention, other types of devices may be used to provide ground paths for ground and microphone contacts in an audio jack. For example, enhancement-mode field-effect transistors may be used. In a specific embodiment of the present invention, floating-gate enhancement-mode FETs may be used. The floating gates may be charged during the manufacturing process or other time to have a positive voltage sufficient to keep the transistors in the on or conducting state when a voltage is not applied to their gate terminals. To turn the floating-gate enhancement-mode FETs off, a negative voltage may be applied to their gate terminals. As before, a charge pump or other power supply may be active when the audio jack is powered up. The charge pump or other power supply may generate a negative voltage thereby turning off the floating-gate enhancement-mode FETs. When power is removed from the audio jack, the charge pump or other power supply may power down and stop providing a voltage to the gate terminals of the floating-gate enhancement-mode FETs. The floating-gate enhancement-mode FETs may turn on or become active, thereby connecting the ground and microphone contacts in the audio jack to ground.

In various embodiments of the present invention, these floating-gate enhancement-mode FETs may be formed on an integrated circuit along with other circuits related to the audio jack. In an illustrative embodiment of the present invention, the floating-gate enhancement-mode FETs may be integrated together on a chip with a charge pump or other power supply. In another illustrative embodiment of the present invention, the floating-gate enhancement-mode FETs may be on an integrated circuit with a coder-decoder (CODEC) circuit for the audio jack. The charge pump or other power supply circuit may be included on this integrated circuit.

In these embodiments of the present invention, the gate terminal and floating gate of a floating-gate enhancement-mode FETs may form a capacitive divider. This divider may capacitively divide a voltage at a gate terminal provided by the charge pump or other power supply circuit. Accordingly, embodiments of the present invention may be constructed or arranged such that the gate terminal capacitance is much greater than the floating gate capacitance. This may help ensure that a sufficient amount of the voltage provided to the gate terminal by the charge pump or other power supply circuit is applied to the floating gate to overcome the pre-charge voltage on the floating gate in order to turn the floating-gate enhancement-mode FET off.

Again, in various embodiments of the present invention, the charge pump or other power supply may be provided in different ways. For example, where floating-gate enhancement-mode FETs are used, a voltage may be generated by an inverter circuit and applied to their gate terminals. In other embodiments of the present invention, a negative voltage may be available through a headset circuit or other source. This negative voltage may be used instead of a voltage from charge pump or other power supply. In other embodiments of the present invention, the negative voltage from the headset circuit or other source may be used when it is available and the voltage from charge pump or other power supply may be used when it is not available.

In still other embodiments of the present invention, micro-electro-mechanical switches, relays, or other types of switches may be used to provide ground paths for ground and microphone contacts in an audio jack. These switches may be normally closed in the absence of an input voltage and may be opened when an input voltage is applied. These switches may instead be electrostatic switches that may be turned on or off and may retain state unless driven to a new state. These switches may instead be normally open in the absence of an input voltage and may be closed when an input voltage is applied.

Embodiments of the present invention may be employed in various electronic devices, such as portable media players, storage devices, tablets, netbooks, laptops, desktops, all-in-one computers, cell, media, and smart phones, wearable computing devices, televisions and other display devices, navigation systems, and other devices.

Various embodiments of the present invention may incorporate one or more of these and the other features described herein. A better understanding of the nature and advantages of the present invention may be gained by reference to the following detailed description and the accompanying drawings.

BRIEF DESCRIPTION OF THE DRAWINGS

FIG. 7A is a symbolic representation of the floating gate enhancement-mode FET that may be used in an embodiment of the present invention;

FIG. 7B illustrates a circuit that may be used to model a gate capacitance of the floating-gate enhancement-mode FET that may be used in an embodiment of the present invention;

FIG. 7C illustrates a layout for transistor 642 that may be employed by embodiments of the present invention;

FIG. 7D illustrates a cutaway side view of the transistor in FIG. 7C;

DESCRIPTION OF ILLUSTRATIVE EMBODIMENTS

Figure 1:
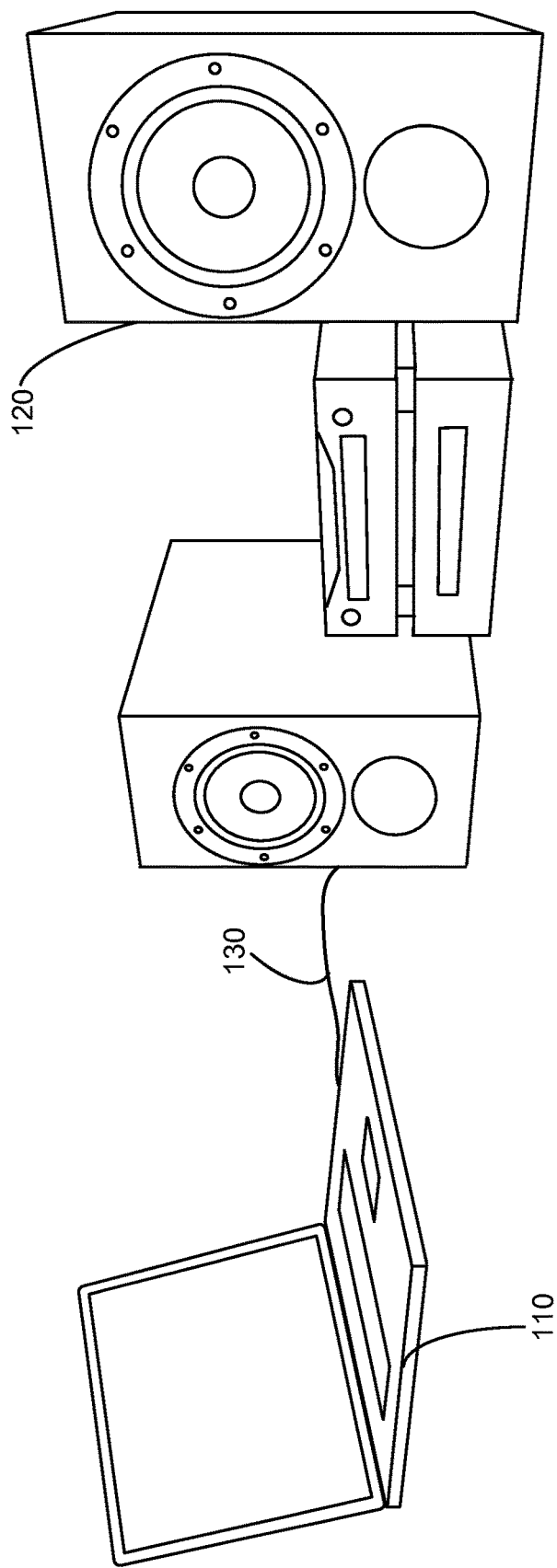
FIG. 1 illustrates an electronic system that may be improved by the incorporation of an embodiment of the present invention.

FIG. 1 illustrates an electronic system that may be improved by the incorporation of an embodiment of the present invention. This figure, as with the other included figures, is shown for illustrative purposes and does not limit either the possible embodiments of the present invention or the claims.

This electronic system may include a portable computer 110 coupled to a home stereo system 120 via audio cable 130. Such a configuration may be used to play music or other audio content stored on portable computer 110 over home stereo system 120.

Audio cable 130 may include an audio plug, which may be plugged into an audio jack on portable computer 110. The audio plug that may be plugged into an audio jack on portable computer 110 may be a three-pole plug or it may be a four-pole plug. Again, if the audio plug is a four-pole plug, it may be a conventional audio plug or it may be of an alternate design. Specifically, the two contacts on the audio plug furthest from the tip may be, in order, microphone then ground, or they may be ground then microphone.

Accordingly, portable computer 110 may include detect circuitry to determine how many poles the audio plug has, and which configuration the audio plug is using if it is a four-pole plug. If the audio plug is a three-pole plug, the ground contact may be grounded. If the plug is a four-pole plug, then depending on the configuration, the appropriate one of the two contacts may be grounded.

A problem with this arrangement may occur when portable computer 110 is powered off while home stereo system 120 remains powered on. Specifically, the circuitry creating the ground connection in portal computer 110 may lose power, and the ground connection may become an open circuit. This floating ground may cause noise from the power supply, such as a hum or noise at 60 Hz, to be amplified and output by the speakers associated with home stereo 120.

One solution may be to power the circuitry that creates the ground connection with a battery in portable computer 110. However, this may draw power from the battery, thereby reducing battery lifetime. Accordingly, embodiments of the present invention may provide circuitry for creating a ground connection that does not require power from the battery in portable computer 110.

In this embodiment of the present invention, portable computer 110 is shown as being connected to a home stereo system 120. In other embodiments of the present invention, portable computer 110 may be connected to other types of powered speakers, headphones, home theater systems, and other grounded speaker systems. Also, portable computer 110 may be another type of computer, media player, or audio source. An example is shown in the following figure.

Figure 2:
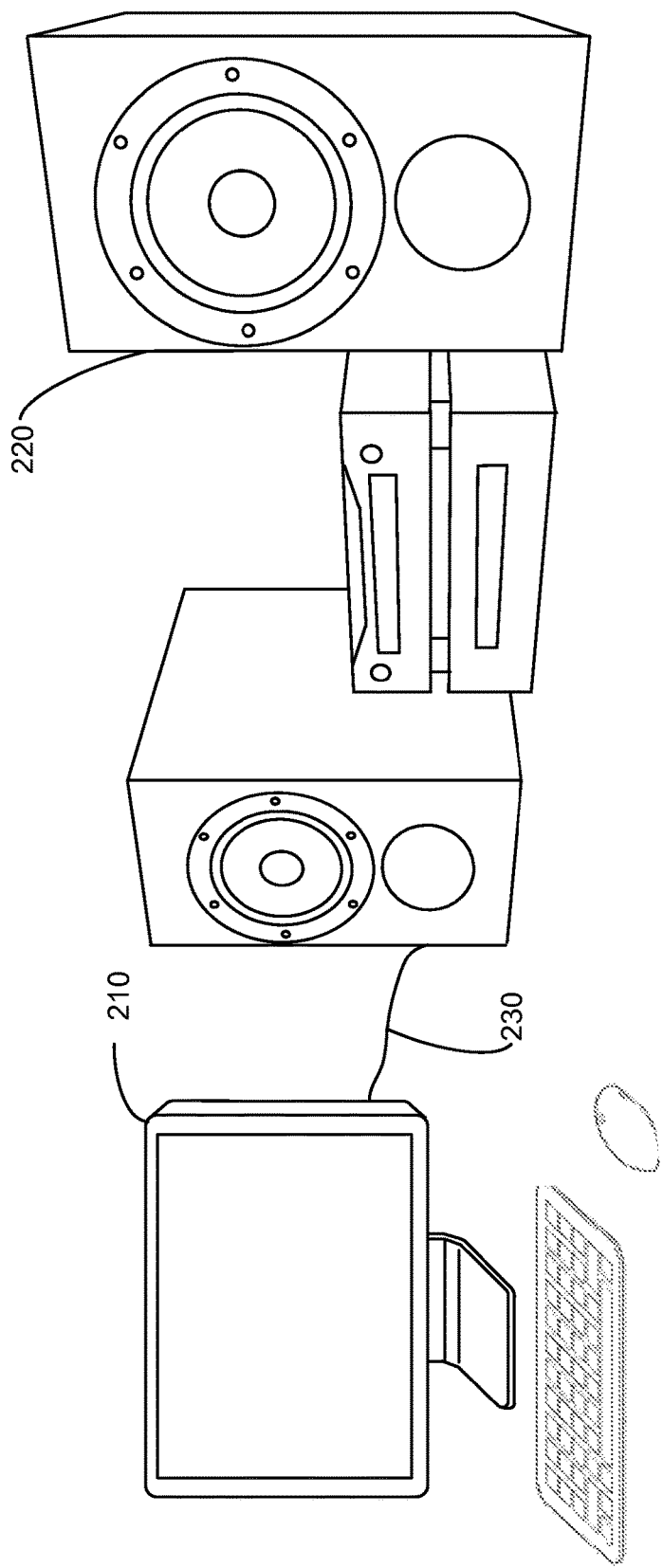
FIG. 2 illustrates another electronic system that may be improved by the incorporation of an embodiment of the present invention.

FIG. 2 illustrates all-in-one computer 210 providing audio information to home stereo system 220 over audio cable 230. Again, when all-in-one computer 210 is powered down while home stereo system 220 is powered up, a floating ground connection in all-in-one computer 210 may generate power supply noise over headphones or other speakers, such as speakers of home stereo system 220. In this example, all-in-one computer 210 may not include a battery that can be used to power grounding circuit. Accordingly, embodiments of the present invention may provide circuitry for creating a ground connection that does not require power. Some examples are shown in the following figures.

Figure 3:
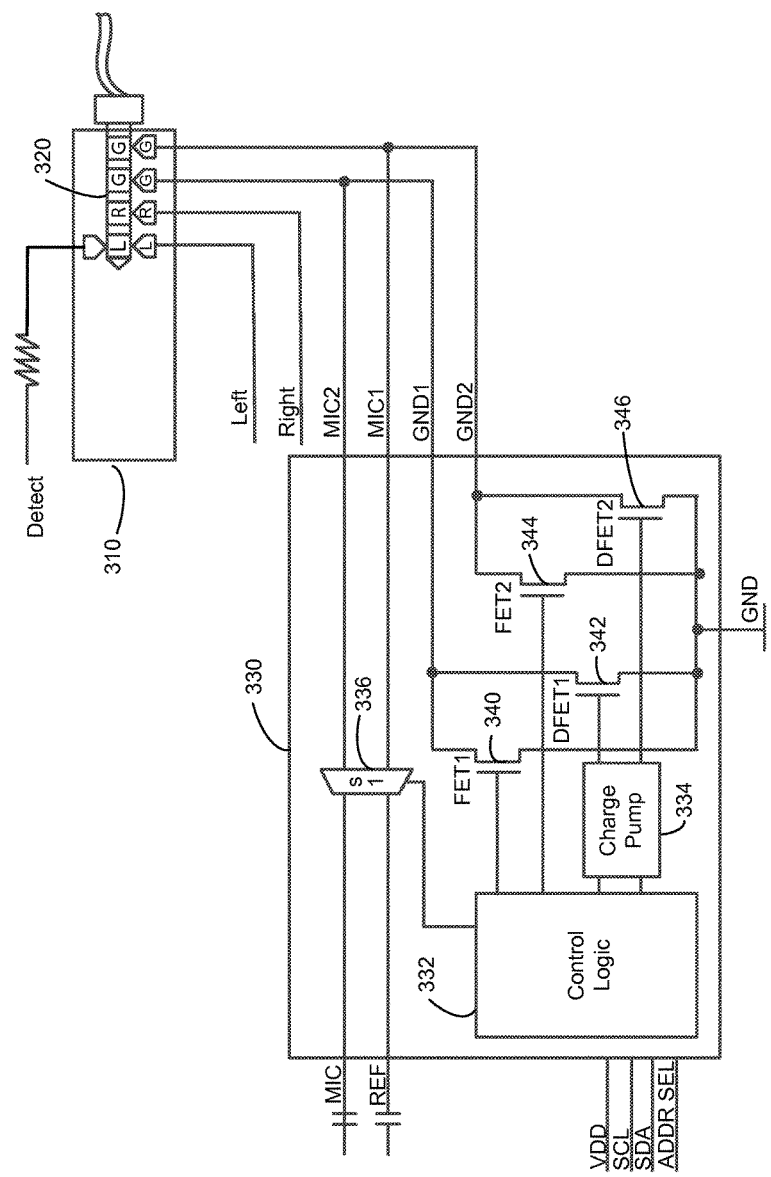
FIG. 3 illustrates grounding and related circuitry for an audio jack according to an embodiment of the present invention.

FIG. 3 illustrates grounding and related circuitry for an audio jack according to an embodiment of the present invention. In this example, audio plug 320 may be inserted into audio jack 310. Audio jack 310 may be located in a portable computer, such as portable computer 110, an all-in-one computer, such as all-in-one computer 210, a portable media device, or another type of electronic device. Audio plug 330 may connect to a home stereo system, such as home stereo systems 120 or 220, or other powered or grounded speakers.

Circuitry 330 may operate in one of two modes. In a power-on mode, an appropriate one or both of the possible ground contacts in audio jack 310 may be grounded. In a power-off mode, both of the possible ground contacts in audio jack 310 may be grounded. In this way, in the power-off mode, the ground connection to the appropriate audio plug 320 contact remains grounded, thereby reducing power supply noise being output by headphones or other speakers, such as speakers of home stereo systems 120 or 220.

In various embodiments of the present invention, circuitry 330 may enter the power-on mode at different times. For example, circuitry 330 may be in the power-on mode whenever power is applied to the electronic device that includes this circuitry. In other embodiments of the present invention, the power-on mode is entered only when the associated audio circuitry is active, while in other embodiments of the present invention, the power-on mode may be entered at other times. In other embodiments of the present invention, the power-off mode may be entered only when the device that includes this circuitry is powered off, while in other embodiments of the present invention, the power-off mode may also be entered when the device enters a sleep state, or at other appropriate times.

Circuitry 330 may be connected to contacts in audio jack 310. These contacts in audio jack 310 may form electrical connections with corresponding contacts on audio plug 320. Circuitry 330 may include multiplexing circuitry 336 for multiplexing microphone and ground circuitry to appropriate contacts in audio jack 310, depending on whether audio plug 320 is a four-pole audio plug of a conventional or alternate configuration. Multiplexing circuitry 336 may be under the control of control logic 332. Specifically, when it is determined that a four-pole audio plug 320 is inserted in audio receptacle 310, detect circuitry may determine whether a conventional or alternate audio plug is present. This circuitry may instruct control logic 322 to configure multiplexing circuitry 336 to couple microphone and ground circuitry to appropriate contacts in audio jack 310. In various embodiments of the present invention, this detect circuitry may be included in CODEC (coding/decoding) circuit, or in other circuitry associated with the audio jack 310.

Circuitry 330 may also include enhancement-mode transistors 340 and 344. In the power-on mode, when audio plug 320 is determined to be a three-pole plug, control logic 332 may drive the gates of both enhancement-mode transistors 340 and 344 high, thereby turning on these transistors and grounding the ground contact in audio jack 310. In other embodiments of the present invention, control logic 332 may drive the gates of either of the enhancement-mode transistors 340 and 344 high, thereby turning on one of these transistors and grounding the ground contact in audio jack 310.

In the power-on mode, when audio plug 320 is determined to be a four-pole plug, control logic 332 may drive a gate of either transistor 340 or transistor 344 high as appropriate, thereby turning one of these transistors and grounding the appropriate contact in audio jack 310. In the power-off mode, transistors 340 and 344 may be off.

Control logic 332 may also control charge pump 334. In the power-on mode, whether audio plug 320 is determined to be a three-pole or four-pole plug, charge pump 334 may drive the gates of depletion mode transistors 342 and 346 to a voltage such that depletion mode transistors 342 and 346 are off. That is, charge pump 334 may drive gates of depletion mode transistors 342 and 346 to a voltage such that depletion mode transistors 342 and 346 are nonconducting and are in a high-impedance state. In various embodiments of the present invention, this voltage may be positive or negative, depending on whether p-channel depletion mode transistors or n-channel depletion mode transistors are used. Control logic 332 may be under the control of I2C data pins SCL and SDA. Since other devices may be on the I2C data bus, an address select line may be used to identify control logic 332.

While in this example, in the power-on mode, depletion mode transistors 342 and 346 are not used, that is, they are off, in other embodiments of the present invention, the depletion mode transistor corresponding to an enhancement mode device that is on may also be turned on such that it is conducting. In these embodiments of the present invention, care should be taken that variations in the output impedance of the depletion mode device do not create noise on the corresponding ground line, which may lead to noise over speakers, such as speakers of home stereo system 120 or 220, headphones, or other speakers.

In the power-off mode, whether audio plug 320 is determined to be a three-pole or four-pole plug, charge pump 334 may allow the gate voltages for depletion mode transistors 342 and 346 to fall to a potential near ground. Accordingly, depletion mode transistors 342 and 346 turn on, thereby grounding the corresponding contacts in audio jack 310. That is, transistors 342 and 346 conduct, and thereby ground the corresponding contacts in audio jack 310. This, in turn, may provide a ground path to help reduce power supply noise on any connected headphones or other speakers.

Again, embodiments of the present invention may include depletion mode transistors, such as depletion mode transistors 342 and 346. They may also include enhancement mode transistors, such as enhancement mode transistors 340 and 344. In a specific embodiment of the present invention, floating-gate enhancement-mode FETs may be used. These depletion mode and enhancement mode transistors may be p-channel or n-channel transistors. In other embodiments of the present invention, these transistors may be replaced or supplemented by other circuits including active and/or passive components. They may also be, or include, other types of transistors that are currently available under development, or that will be developed.

Various embodiments of the present invention may provide an integrated circuit including a charge pump and depletion mode transistors. Examples are shown in the following figures.

Figure 4:
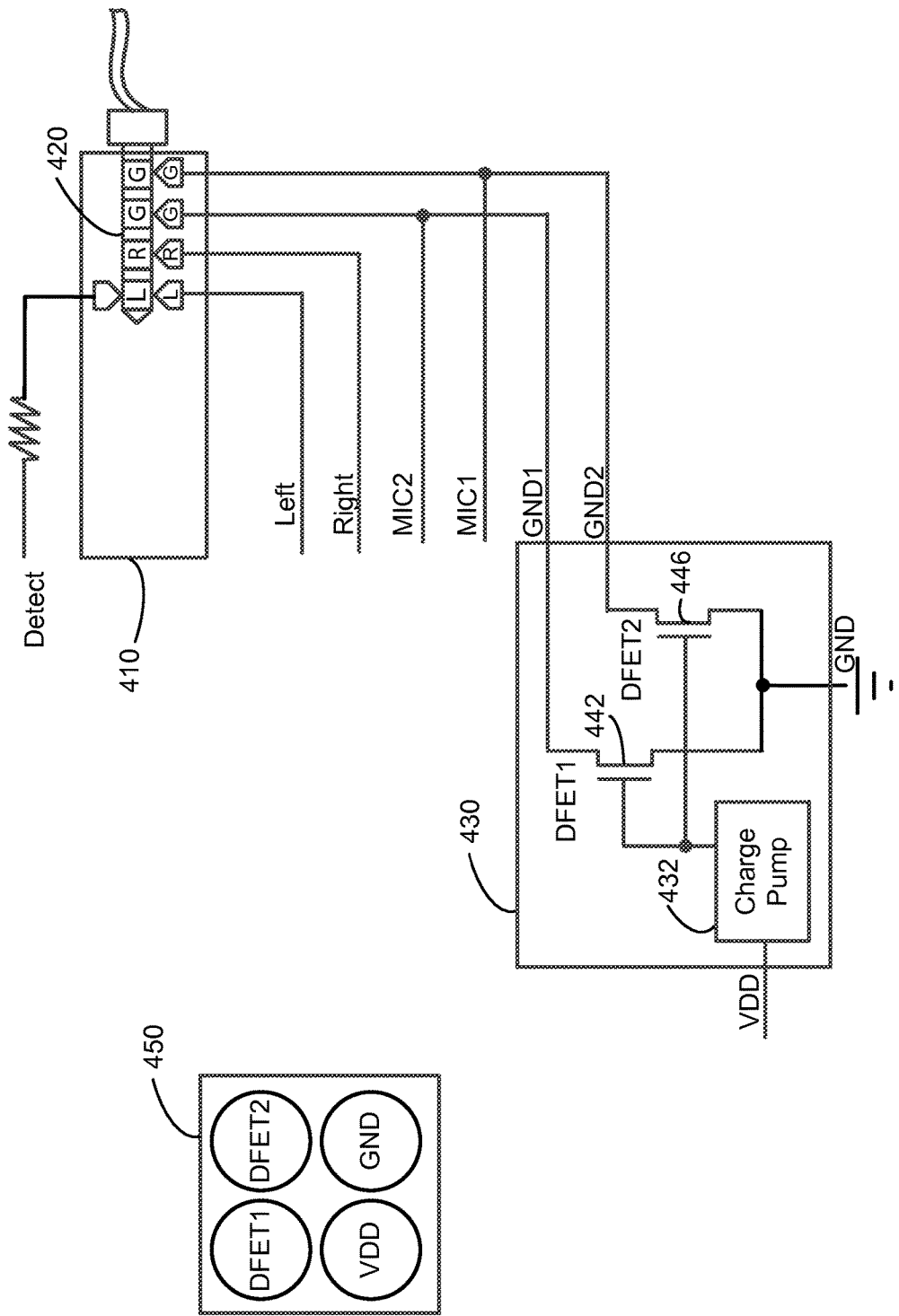
FIG. 4 illustrates an integrated circuit according to an embodiment of the present invention.

FIG. 4 illustrates an integrated circuit according to an embodiment of the present invention. In this example, integrated circuit 430 is coupled to terminals in audio jack 410. Audio plug 420 is inserted into the receptacle 410. Integrated circuit 430 may include charge pump 432 and depletion mode transistors 442 and 446. Depletion mode transistor 442 may have a first source/drain region connected to a first contact in audio jack 410, and a second source/drain region coupled to ground. Depletion mode transistor 446 may have a first source/drain region coupled to a second contact in audio jack 410, and a second source/drain region coupled to ground. Gates of these depletion mode transistors may be driven by charge pump 432. Specifically, when an input power supply VDD is received at power supply terminal VDD, charge pump 432 may provide a voltage to turn off depletion mode transistors 442 and 446. A pinout for integrated circuit 430 is shown as pinout 450.

Again, in the power on mode, an input power supply VDD may be received by charge pump 432 at power supply terminal VDD, which may provide a voltage to gates of depletion mode transistors 442 and 446. Noise on the voltage at the gates of depletion mode transistors 442 and 446 may couple through the gate/drain capacitance of the transistors to the contacts in audio jack 410. This again may appear as noise on speakers of home stereo system 120 or 220. Accordingly, embodiments of the present invention may employ a bypass capacitor to suppress this noise. An example is shown in the following figure.

Figure 5:
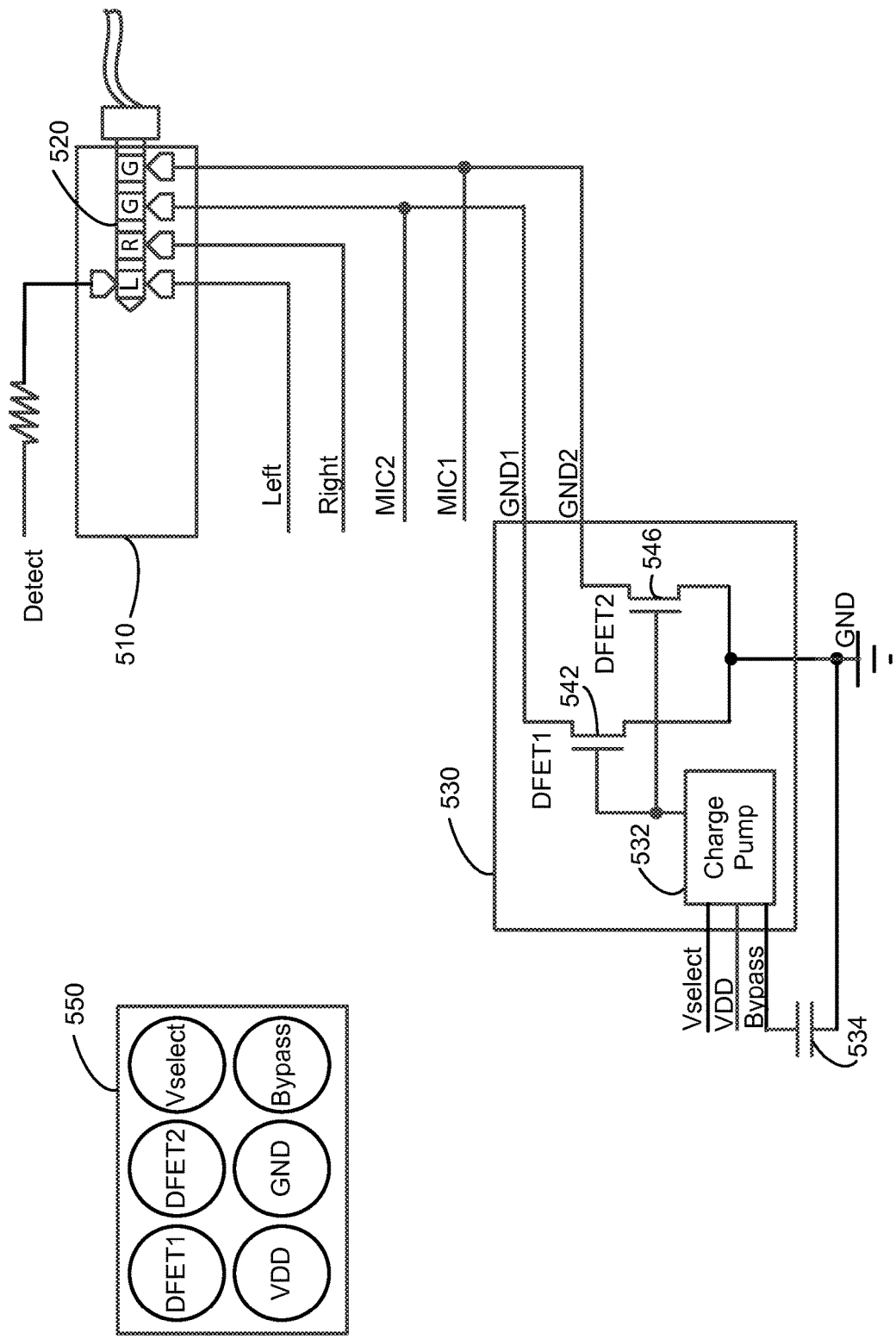
FIG. 5 illustrates another integrated circuit according to an embodiment of the present invention.

FIG. 5 illustrates another integrated circuit according to an embodiment of the present invention. In this example, charge pump 532 may include an additional pin to connect to a bypass capacitor 534. This bypass capacitor may be used to suppress noise at the gates of depletion mode transistors 542 and 546 in the power-on mode. Charge pump 532 may also receive a voltage select signal Vselect. This select signal may identify a voltage level for input power supply VDD. A pinout for integrated circuit 530 is shown as pinout 550.

In other embodiments of the present invention, other types of devices may be used to provide ground paths for ground and microphone contacts in an audio jack. For example, enhancement-mode field-effect transistors may be used. In a specific embodiment of the present invention, floating-gate enhancement-mode FETs may be used. The floating gates may be charged during the manufacturing process to have a positive voltage sufficient to keep the transistors in the on or conducting state when a voltage is not applied to their gate terminals. To turn the floating-gate enhancement-mode FETs off, a negative voltage may be applied to their gate terminals. As before, a charge pump or other power supply may be active when the audio jack is powered up. The charge pump or other power supply may generate a negative voltage thereby turning off the floating-gate enhancement-mode FETs. When power is removed from the audio jack, the charge pump or other power supply may power down and stop providing a voltage to the gate terminals of the floating-gate enhancement-mode FETs. The floating-gate enhancement-mode FETs may turn on or become active, thereby connecting the ground and microphone contacts in the audio jack to ground. An example of a system using floating-gate enhancement-mode FETs is shown in the following figure.

Figure 6:
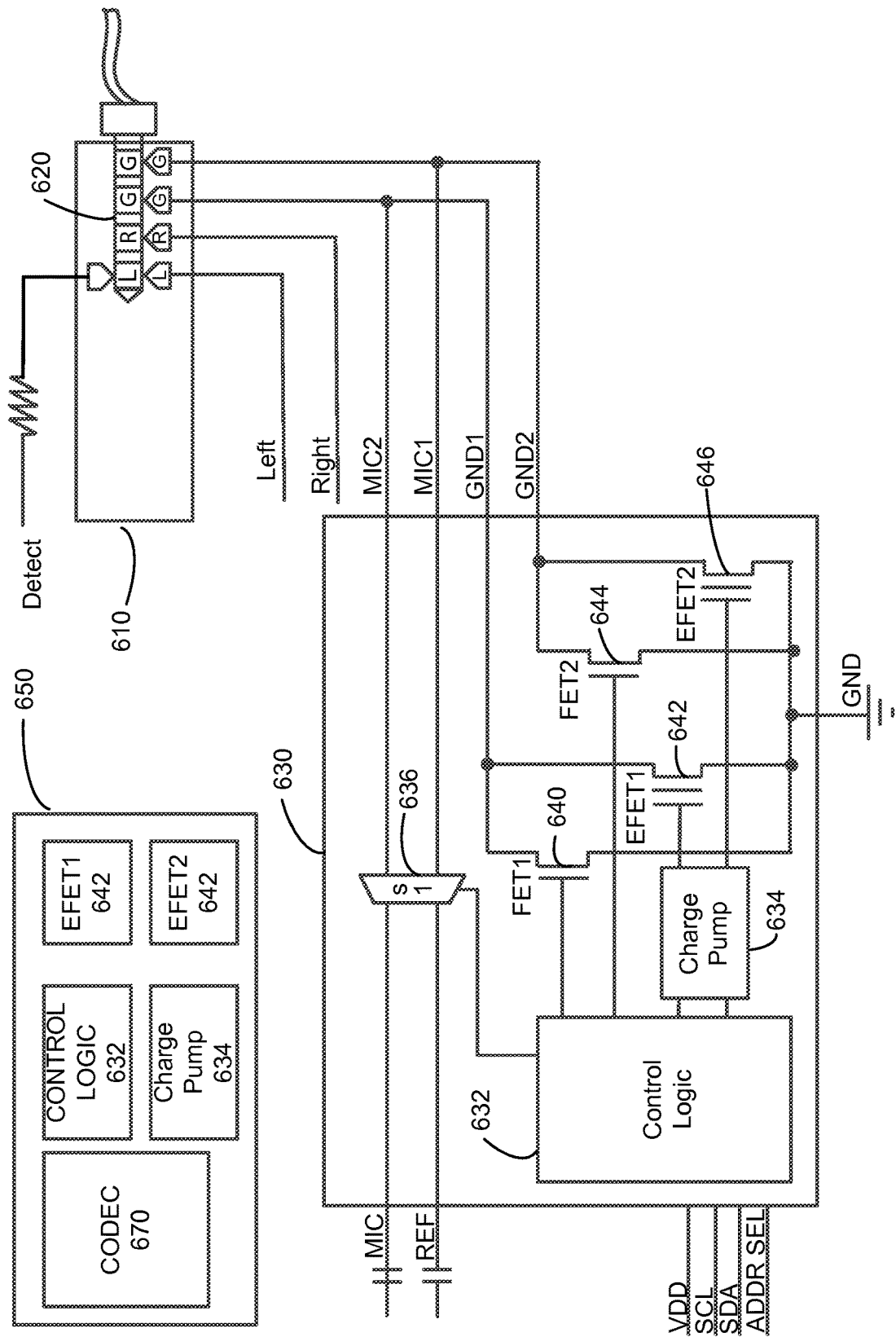
FIG. 6 illustrates grounding and related circuitry for an audio jack according to an embodiment of the present invention.

FIG. 6 illustrates grounding and related circuitry for an audio jack according to an embodiment of the present invention. In this example, audio plug 620 may be inserted into audio jack 610. As with the other audio jacks in other examples, audio jack 610 may be located in a portable computer, such as portable computer 110, an all-in-one computer, such as all-in-one computer 210, a portable media device, or another type of electronic device. Audio plug 630 may connect to a home stereo system, such as home stereo systems 120 or 220, or other powered or grounded speakers.

As before, circuitry 630 may operate in one of two modes. In a power-on mode, an appropriate one or both of the possible ground contacts in audio jack 610 may be grounded. In a power-off mode, both of the possible ground contacts in audio jack 610 may be grounded. In this way, in the power-off mode, the ground connection to the appropriate audio plug 620 contact remains grounded, thereby reducing power supply noise being output by headphones or other speakers, such as speakers of home stereo systems 120 or 220.

In various embodiments of the present invention, circuitry 630 may enter the power-on mode at different times. For example, circuitry 630 may be in the power-on mode whenever power is applied to the electronic device that includes this circuitry. In other embodiments of the present invention, the power-on mode is entered only when the associated audio circuitry is active, while in other embodiments of the present invention, the power-on mode may be entered at other times. In other embodiments of the present invention, the power-off mode may be entered only when the device that includes this circuitry is powered off, while in other embodiments of the present invention, the power-off mode may also be entered when the device enters a sleep state, or at other appropriate times.

Circuitry 630 may be connected to contacts in audio jack 610. These contacts in audio jack 610 may form electrical connections with corresponding contacts on audio plug 620. Circuitry 630 may include multiplexing circuitry 636 for multiplexing microphone and ground circuitry to appropriate contacts in audio jack 610, depending on whether audio plug 620 is a four-pole audio plug of a conventional or alternate configuration. Multiplexing circuitry 636 may be under the control of control logic 632. Specifically, when it is determined that a four-pole audio plug 620 is inserted in audio receptacle 610, detect circuitry may determine whether a conventional or alternative audio plug is present. This circuitry may instruct control logic 632 to configure multiplexing circuitry 636 to couple microphone and ground circuitry to appropriate contacts in audio jack 610. In various embodiments of the present invention, this detect circuitry may be included in CODEC (coding/decoding) circuit, or in other circuitry associated with the audio jack 610.

Circuitry 630 may also include conventional enhancement-mode transistors 640 and 644. These transistors may be convention in that they do not include a floating gate. In the power-on mode, when audio plug 620 is determined to be a three-pole plug, control logic 632 may drive the gates of conventional enhancement-mode transistors 640 and 644 high, thereby turning on these transistors and grounding the ground contact in audio jack 610. In other embodiments of the present invention, control logic 632 may drive the gates of either of the conventional enhancement-mode transistors 640 and 644 high, thereby turning on one of these transistors and grounding the ground contact in audio jack 610.

In the power-on mode, when audio plug 620 is determined to be a four-pole plug, control logic 632 may drive a gate of either transistor 640 or transistor 644 high as appropriate, thereby turning one of these transistors and grounding the appropriate contact in audio jack 610. In the power-off mode, transistors 640 and 644 may be off.

Control logic 632 may also control charge pump 634. In the power-on mode, whether audio plug 620 is determined to be a three-pole or four-pole plug, charge pump 634 may drive the gates of floating-gate enhancement-mode FET 642 and 646 to a voltage such that enhancement-mode transistors 642 and 646 are off. That is, charge pump 634 may drive gates of floating-gate enhancement-mode FET 642 and 646 to a voltage such that floating-gate enhancement-mode FET 642 and 646 are nonconducting and are in a high-impedance state. In various embodiments of the present invention, this voltage may be positive or negative, depending on whether p-channel transistors or n-channel transistors are used and depending on a pre-charge voltage on the floating gate. Control logic 632 may be under the control of I2C data pins SCL and SDA. Since other devices may be on the I2C data bus, an address select line may be used to identify control logic 632.

While in this example, in the power-on mode, floating-gate enhancement-mode FETs 642 and 646 are not used, that is, they are off, in other embodiments of the present invention, the floating-gate enhancement-mode FET corresponding to a conventional enhancement mode device that is on may also be turned on such that it is conducting. In these embodiments of the present invention, care should be taken that variations in the output impedance of the floating-gate enhancement-mode FETs do not create noise on the corresponding ground line, which may lead to noise over speakers, such as speakers of home stereo system 120 or 220, headphones, or other speakers.

In the power-off mode, whether audio plug 620 is determined to be a three-pole or four-pole plug, charge pump 634 may allow the gate voltages for floating-gate enhancement-mode FET 642 and 646 to rise to a potential near ground. Accordingly, floating-gate enhancement-mode FETs 642 and 646 turn on, thereby grounding the corresponding contacts in audio jack 610. That is, transistors 642 and 646 conduct, and thereby ground the corresponding contacts in audio jack 610. This, in turn, may provide a ground path to help reduce power supply noise on any connected headphones or other speakers.

The control logic 632, charge pump 634, and floating-gate enhancement-mode FETs 642 and 646, may be integrated together on an integrated circuit 670. Other circuits, such as coder-decoder circuit CODEC 670 may be included on the same device. This may be enabled at least in part by the ability to manufacture floating-gate enhancement-mode FETs 642 and 646 using conventional CMOS techniques. In on embodiment of the present invention, the floating gates of FETs 642 and 646 may be formed using conventional gate manufacturing steps, while the gate terminals of FETs 642 and 646 may be formed using a poly layer of a conventional CMOS process, where the poly layer is typically used to form resistors, interconnect, or both.

Again, in various embodiments of the present invention, charge pump 634 or other voltage source may turn off floating-gate enhancement-mode transistors 642 and 646 by applying a voltage to their gate terminals that may be positive or negative, depending on whether p-channel transistors or n-channel transistors are used and depending on a pre-charge voltage on the floating gate. In a specific embodiment of the present invention, the floating-gate enhancement-mode FET may be a p-channel device. In this embodiment of the present invention, the floating gate may be pre-charged charged with a negative voltage during manufacturing or other time. The negative voltage may be sufficient to maintain the p-channel transistor in the on or conducting state when the gate terminal of the transistor is at zero volts or is an open circuit. A positive voltage may be applied to the gate terminal of the device to turn off the p-channel transistor.

Again, in the above specific embodiment of the present invention, an n-channel floating-gate enhancement-mode FET may be used. The floating-gate may be pre-charged with a positive voltage sufficient to maintain the p-channel transistor in the on or conducting state when the gate terminal of the transistor is at zero volts or is an open circuit. This may be done at manufacturing or other time. A positive voltage may be applied to the gate terminal of the device to turn off the n-channel transistor. An example of a transistor that may be used in embodiments of the present invention is shown in the following figures.

FIG. 7A is a symbolic representation of the floating gate enhancement-mode FET that may be used in an embodiment of the present invention. The drain, gate, and source terminals of transistors 642 may be identified by letters D, G, and S. The channel of the transistor may be represented by an indentation in a line between the drain and the source. The floating gate may be represented by a line between a gate terminal and a channel parallel to the gate terminal.

The floating gate of transistor 642 may be configured to be a second gate between the gate terminal and channel of the transistor. Accordingly, the gate capacitance of transistor 642 may be modeled as a series of two capacitors. An example is shown in the following figure.

FIG. 7B illustrates a circuit that may be used to model a gate capacitance of the floating-gate enhancement-mode FET that may be used in an embodiment of the present invention. A first capacitor C1 may be located between the gate terminal and the floating gate of the transistor, while a second capacitor C2 may be located between the floating gate and the source or channel of transistor 642. These series capacitors may form a capacitor divider that may divide a voltage receive at the gate terminal relative to the source. Specifically, when capacitors C1 and C2 are equal, half of a voltage applied to the gate terminal relative to the source may appear across the floating gate capacitance C2. This may mean that only half the voltage applied to the gate terminal of transistor 642 may actually appear at its floating gate. This voltage may not be sufficient to turn off the n-channel transistor.

Accordingly, in various embodiments the present invention, capacitor C1 may be made larger relative to capacitor C2. In this way, the impedance of C1 may be reduced and a larger share of the voltage applied to the gate terminal may appear at the floating gate of transistor 642. An example of one such transistor is shown in the following figure.

FIG. 7C illustrates a layout for transistor 642 that may be employed by embodiments of the present invention. In this example, capacitors C1 may be made much larger than capacitor C2. In this example, it may be accomplished by adding serpentine structures to C1. It should be noted again that this layout is shown for illustrative purposes. This increase in capacitance may mean that more of the voltage applied to the gate terminal may appear at the floating gate of transistor 642. This may aid in turning off the floating gate n-channel enhancements mode FET. In other embodiments of the present invention, similar concepts may be applied to different layouts of different transistors. In this example, the floating gate may be formed of a first polysilicon layer, while the gate terminal is formed of a second polysilicon gate layer. These two polysilicon layers may be coincident in the area shown as C1. The floating gate capacitance to the channel or source may be shown as C2. As can be seen, capacitor C1 may be much larger than capacitor C2 in area. In embodiments of the present invention, the dielectric or oxide materials between the layers may be varied to further increase the difference in capacitance.

FIG. 7D illustrates a cutaway side view of the transistor in FIG. 7C. In this example, a channel may be located in a substrate. Again, this channel may be an n-channel, though in other embodiments of the present invention, it may be a p-channel. An oxide layer may be formed of a channel which may be covered by a first polysilicon layer. This first polysilicon layer may be the floating gate. The first polysilicon layer may be formed using a conventional gate mask in a conventional CMOS device. A second oxide layer may be placed over the first polysilicon layer. A second polysilicon layer may be placed over the second oxide layer. This second polysilicon layer may be a special layer to form the gate terminal, or it may be an existing layer in a CMOS process. In one embodiment of the present invention, a second polysilicon layer may be a polysilicon layer used in forming resistors, interconnect, or both.

Again, in other embodiments of the present invention, other types of devices may be used to provide ground paths for ground and microphone contacts in an audio jack. For example, other types of transistors or other types of devices, such as micro-electro-mechanical switches, relays, or other types of switches, may be used. An example is shown in the following figure.

Figure 8:
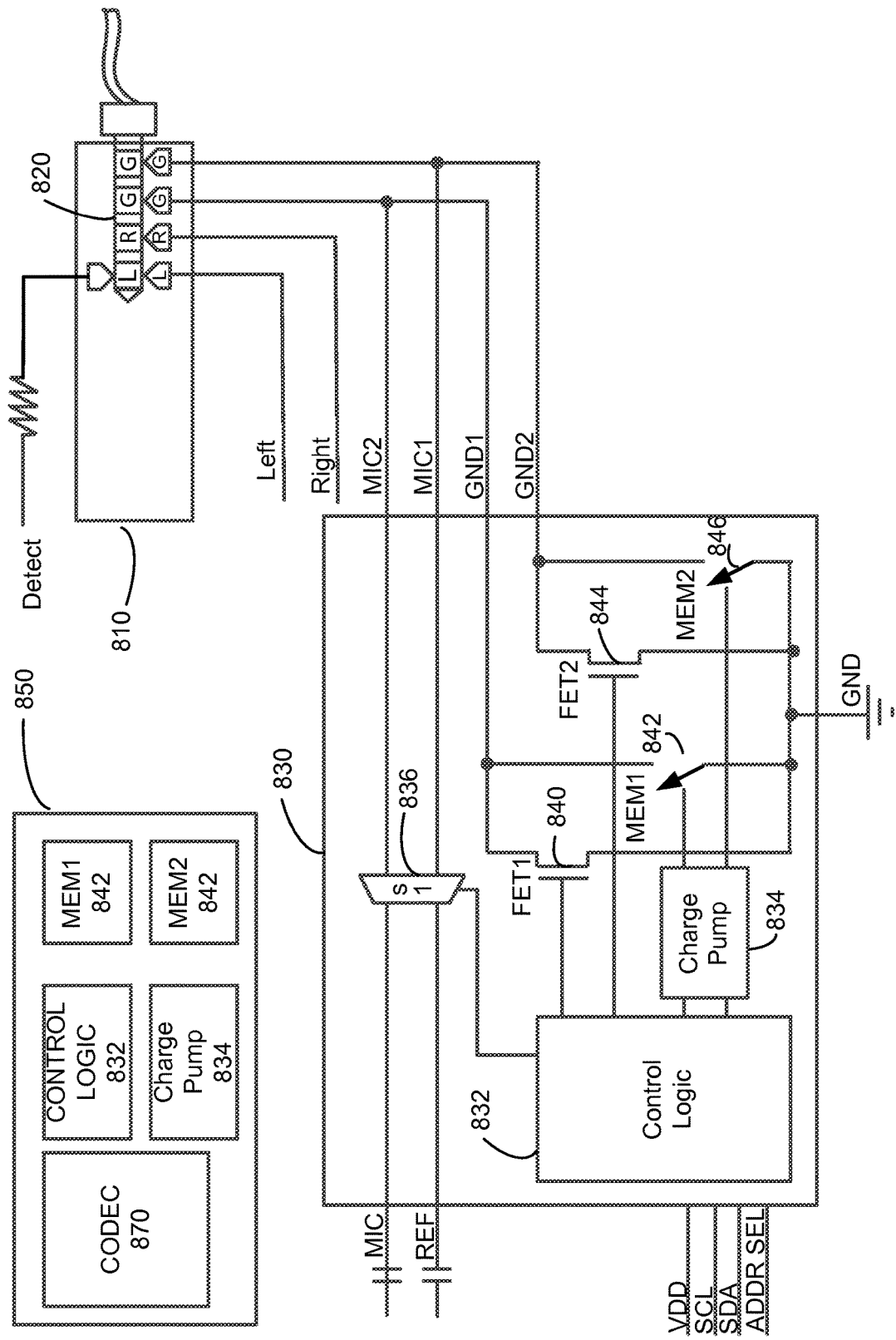
FIG. 8 illustrates grounding and related circuitry for an audio jack according to an embodiment of the present invention.

FIG. 8 illustrates grounding and related circuitry for an audio jack according to an embodiment of the present invention. In this example, micro-electro-mechanical (MEM) switches 842 and 846 may be used in place of depletion or enhancement mode transistors. Audio plug 820, audio jack 810 may be the same or similar as the other audio plugs and jacks in other embodiments of the present invention. Circuitry 830 may be formed and operate in the same or similar way as similar circuits in other embodiments of the present invention. In this example, as with the other examples, circuitry 830 may include conventional enhancement-mode transistors 840 and 844, and they may operate in the same or similar manner as in other embodiments of the present invention.

As before, control logic 832 may control charge pump 834. In the power-on mode, whether audio plug 820 is determined to be a three-pole or four-pole plug, charge pump 834 may drive the inputs to MEM switches 842 and 846 to a voltage that may open the switches to disconnect terminals GND1 and GND2 from GND. That is, charge pump 634 may drive inputs of the MEM switches 842 and 846 to a voltage such that MEM switches 842 and 846 are nonconducting and are in a high-impedance state. In various embodiments of the present invention, this voltage may be positive or negative, depending on the type of MEM switches used.

While in this example, in the power-on mode, MEM switches 842 and 846 are off, in other embodiments of the present invention, the MEM switch that corresponds to a conventional enhancement mode device that is on or conducting may also be turned on such that it is conducting. In these embodiments of the present invention, care should be taken that variations in the output impedance of the MEM switches do not create noise on the corresponding ground line, which may lead to noise over speakers, such as speakers of home stereo system 120 or 220, headphones, or other speakers.

In the power-off mode, whether audio plug 820 is determined to be a three-pole or four-pole plug, charge pump 834 may drive the input voltages of MEM switches 842 and 846 such that they conduct and connect terminals GND1 and GND2 to GND.

The control logic 832, charge pump 834, and MEM switches 842 and 846, may be integrated together on an integrated circuit 870. Other circuits, such as coder-decoder circuit CODEC 870 may be included on the same device. This may be enabled at least in part by the ability to manufacture MEM switches 842 and 846 using conventional CMOS techniques.

Again, in various embodiments of the present invention, charge pump 634 or other voltage source may turn MEM switches 842 and 846 off and on in various ways depending on the type of MEM switch used. In these embodiments of the present invention, an input voltage may be applied at the input terminal relative to ground. This input voltage may close the MEM switches such that GND1 and GND2 terminals are shorted or connected together. In other embodiments of the present invention, an input voltage may cause GND1 and GND2 to be disconnected from GND. In other embodiments of the present invention, a MEM switch may maintain its position until a voltage VIN is applied. The input voltage VIN may be negative or positive, depending on the type of MEM switch used.

Figure 9:
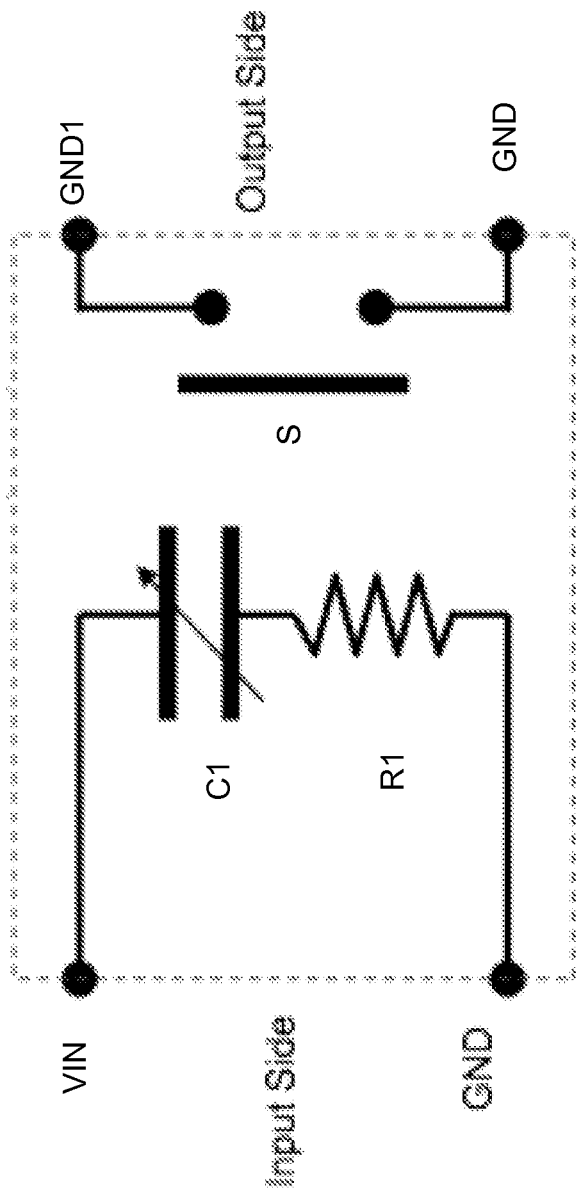
FIG. 9 is an illustration of a representation or model of a MEM switch that may be used by an embodiment of the present invention.

FIG. 9 is an illustration of a representation or model of a MEM switch that may be used by an embodiment of the present invention. Again, an input voltage may be applied at the input terminal VIN relative to ground. This input voltage may move plate S such that the GND1 and GND terminals are shorted or connected together. In other embodiments of the present invention, the voltage may move plate S such that GND1 and GND terminals are disconnected. In other embodiments of the present invention, plate S may maintain its position until a voltage VIN is applied. VIN may be negative or positive, depending on the type of MEM switch used.

In this example, the input may be modeled as a variable capacitor C1 in series with a resistor R1. The output may be modeled as two disconnected pins and a plate S that may move to short or connect the two pins.

Figure 10:
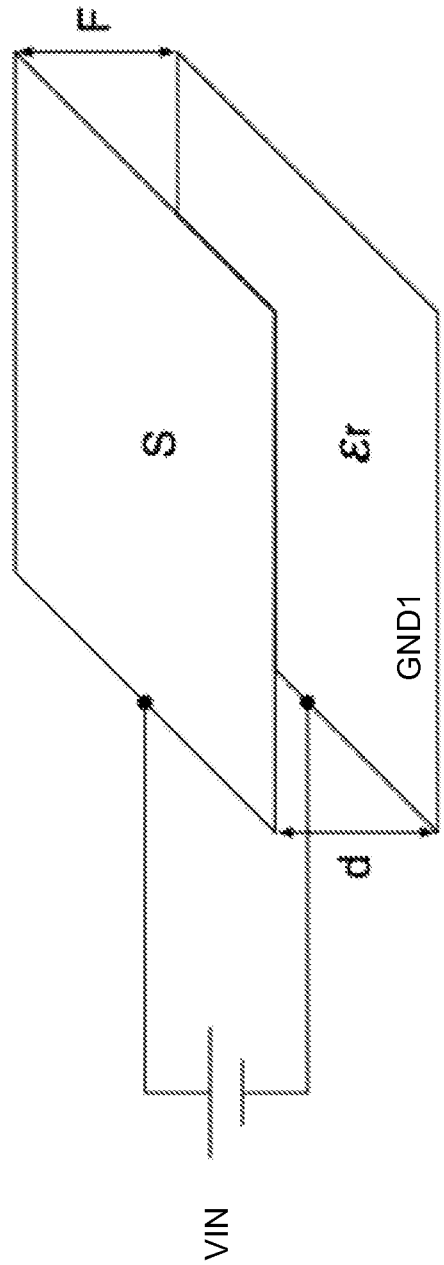
FIG. 10 illustrates the forces that may be exerted by an input voltage on a MEM switch used in an embodiment of the present invention.

FIG. 10 illustrates the forces that may be exerted by an input voltage on a MEM switch used in an embodiment of the present invention. Again, in various embodiments of the present invention, a voltage applied at VIN may move plate S such that it shorts to a terminal, shown here as GND1. In other embodiments of the present invention, an input voltage may drive these plate away from GND1, while in other embodiments of the present invention, plate S may maintain its position until an input voltage VIN is supplied.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. An electronic device comprising:
   an audio jack comprising a first contact and a second contact;
   audio circuitry comprising a microphone circuit;
   multiplexing circuitry to couple the microphone circuit to the first contact or to the second contact;
   a first switch coupled between the first contact and ground, where the first switch is a floating-gate enhancement-mode transistor; and
   a second switch coupled between the second contact and ground,
   wherein the first switch and the second switch are off when the electronic device is powered on and the audio circuit is active, and the first switch and the second switch are on when the electronic device is powered off.

2. The electronic device of claim 1 wherein the first switch is an n-channel floating-gate enhancement-mode transistor.

3. The electronic device of claim 1 wherein the first switch is a p-channel floating-gate enhancement-mode transistor.

4. The electronic device of claim 1 wherein the first switch is a first floating-gate enhancement-mode transistor and the second switch is a second floating-gate enhancement-mode transistor and the first and second floating-gate enhancement-mode transistors are n-channel floating-gate enhancement-mode transistors.

5. The electronic device of claim 4 wherein the first floating-gate enhancement-mode transistor and the second floating-gate enhancement-mode transistor are on when the electronic device is in a sleep state.

6. The electronic device of claim 4 further comprising a control circuit to turn off the first floating-gate enhancement-mode transistor and the second floating-gate enhancement-mode transistor when the electronic device is powered on and the audio circuitry is active, and to allow the first enhancement-mode transistor and the second floating-gate enhancement-mode transistor to turn on when the electronic device is powered off.

7. The electronic device of claim 4 further comprising a charge pump to drive a gate of the first floating-gate enhancement-mode transistor and a gate of the second floating-gate enhancement-mode transistor to a negative voltage when the electronic device is powered on.

8. The electronic device of claim 4 further comprising a charge pump to drive a gate of the first floating-gate enhancement-mode transistor and a gate of the second floating-gate enhancement-mode transistor to a positive voltage when the electronic device is powered on and the audio circuitry is active.

9. The electronic device of claim 4 further comprising a charge pump to drive a gate of the first floating-gate enhancement-mode transistor and a gate of the second floating-gate enhancement-mode transistor to a negative voltage when the electronic device is powered on and the audio circuitry is active.

10. The electronic device of claim 9 wherein the floating gates of the first floating-gate enhancement-mode transistor and the second floating-gate enhancement-mode transistor are pre-charged such that they are on when no voltage is applied to their gate terminals.

11. An integrated circuit comprising:
a coder-decoder circuit;
a control circuit coupled to the coder-decoder circuit;
a first floating-gate enhancement-mode transistor having a first source/drain region coupled to a first pad and a second source drain/region coupled to a ground pad;
a second floating-gate enhancement-mode transistor having a first source/drain region coupled to a second pad and a second source drain/region coupled to a ground pad; and
a charge pump having an input coupled to the control circuit and an output coupled to a gate terminal of the first floating-gate enhancement-mode transistor and a gate terminal of the second floating-gate enhancement-mode transistor.

12. The integrated circuit of claim 11 wherein the first floating-gate enhancement-mode transistor is a p-channel floating-gate enhancement-mode transistor.

13. The integrated circuit of claim 11 wherein the first floating-gate enhancement-mode transistor is an n-channel floating-gate enhancement-mode transistor.

14. The integrated circuit of claim 11 wherein when a device housing the integrated circuit is on, the output of the charge pump turns off the first floating-gate enhancement-mode transistor and the second floating-gate enhancement-mode transistor.

15. The integrated circuit of claim 14 wherein when the device is off, the output of the charge pump allows the first floating-gate enhancement-mode transistor and the second floating-gate enhancement-mode transistor to turn on.

16. The integrated circuit of claim 11 wherein the charge pump is further coupled to receive a select signal indicating a voltage level of a first power supply.

17. The integrated circuit of claim 11 wherein the charge pump is further coupled to a pad for a bypass capacitor.

18. A method of selectively grounding a contact in an audio jack comprising:
receiving a first voltage at a first power supply terminal;
providing a second voltage to a gate of a first floating-gate enhancement-mode transistor and a gate of a second floating-gate enhancement-mode transistor such that the first floating-gate enhancement-mode transistor and the second floating-gate enhancement-mode transistor are off;
receiving a ground level voltage at the first power supply terminal; and
providing a ground level voltage to a gate of a first floating-gate enhancement-mode transistor and a gate of a second floating-gate enhancement-mode transistor such that the first floating-gate enhancement-mode transistor and the second floating-gate enhancement-mode transistor are on and a first contact and a second contact in an audio jack are grounded.

19. The method of claim 18 wherein the first floating-gate enhancement-mode transistor is a p-channel floating-gate enhancement-mode transistor.

20. The method of claim 18 wherein the first floating-gate enhancement-mode transistor is an n-channel floating-gate enhancement-mode transistor.

21. The method of claim 18 wherein a ground level signal is received at the first power supply terminal when an electronic device housing the first floating-gate enhancement-mode transistor and the second floating-gate enhancement-mode transistor is powered off.

22. The method of claim 18 wherein a ground level signal is received at the first power supply terminal when an electronic device housing the first floating-gate enhancement-mode transistor and the second floating-gate enhancement-mode transistor is in a sleep mode.

* * * * *